US008903108B2

(12) United States Patent
Isaac et al.

(10) Patent No.: US 8,903,108 B2
(45) Date of Patent: *Dec. 2, 2014

(54) NEAR-FIELD NULL AND BEAMFORMING

(75) Inventors: Ronald Nadim Isaac, San Jose, CA (US); Martin E. Johnson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 333 days.

This patent is subject to a terminal disclaimer.

(21) Appl. No.: 13/343,430

(22) Filed: Jan. 4, 2012

(65) Prior Publication Data

US 2013/0142356 A1 Jun. 6, 2013

Related U.S. Application Data

(63) Continuation-in-part of application No. 13/312,498, filed on Dec. 6, 2011.

(51) Int. Cl.
*H04R 3/00* (2006.01)
*H04B 15/00* (2006.01)

(52) U.S. Cl.
USPC .................................. 381/92; 381/93; 381/96

(58) Field of Classification Search
CPC ........... H04R 2430/20; H04R 2430/21; H04R 2430/23; H04R 2430/25; H04R 3/005; H04R 3/00; H04R 3/02; H04M 9/082
USPC ................................................ 381/92, 93, 96
See application file for complete search history.

(56) References Cited

U.S. PATENT DOCUMENTS 4,081,631 A 3/1978 Feder
4,658,425 A 4/1987 Julstrom
5,121,426 A 6/1992 Baumhauer, Jr. et al.
5,335,011 A 8/1994 Addeo et al.
5,570,324 A 10/1996 Geil
5,619,583 A 4/1997 Page et al.

(Continued)

FOREIGN PATENT DOCUMENTS

EP 2094032 8/2009
GB 2310559 8/1997

(Continued)

OTHER PUBLICATIONS

Baechtle et al., "Adjustable Audio Indicator," IBM, 2 pages, Jul. 1, 1984.

(Continued)

*Primary Examiner* — Vivian Chin
*Assistant Examiner* — David Ton
(74) *Attorney, Agent, or Firm* — Blakely, Sokoloff, Taylor & Zafman LLP

(57) ABSTRACT

Devices and methods are disclosed that allow for selective acoustic near-field nulls for microphone arrays. One embodiment may take the form of an electronic device including a speaker and a microphone array. The microphone array may include a first microphone positioned a first distance from the speaker and a second microphone positioned a second distance from the speaker. The first and second microphones are configured to receive an acoustic signal. The microphone array further includes a complex vector filter coupled to the second microphone. The complex vector filter is applied to an output signal of the second microphone to generate an acoustic sensitivity pattern for the array that provides an acoustic null at the location of the speaker.

19 Claims, 12 Drawing Sheets

(56) References Cited

U.S. PATENT DOCUMENTS

| | | | |
|---|---|---|---|
| 6,069,961 A | 5/2000 | Nakazawa | |
| 6,073,033 A | 6/2000 | Campo | |
| 6,129,582 A | 10/2000 | Wilhite et al. | |
| 6,151,401 A | 11/2000 | Annaratone | |
| 6,154,551 A | 11/2000 | Frenkel | |
| 6,192,253 B1 | 2/2001 | Charlier et al. | |
| 6,317,237 B1 | 11/2001 | Nakao et al. | |
| 6,813,218 B1 | 11/2004 | Antonelli et al. | |
| 6,829,018 B2 | 12/2004 | Lin et al. | |
| 6,882,335 B2 | 4/2005 | Saarinen | |
| 6,914,854 B1 | 7/2005 | Heberley et al. | |
| 6,934,394 B1 | 8/2005 | Anderson | |
| 6,980,485 B2 | 12/2005 | McCaskill | |
| 7,003,099 B1 | 2/2006 | Zhang et al. | |
| 7,082,322 B2 | 7/2006 | Harano | |
| 7,154,526 B2 | 12/2006 | Foote et al. | |
| 7,158,647 B2 | 1/2007 | Azima et al. | |
| 7,263,373 B2 | 8/2007 | Mattisson | |
| 7,266,189 B1 | 9/2007 | Day | |
| 7,378,963 B1 | 5/2008 | Begault et al. | |
| 7,536,029 B2 | 5/2009 | Choi et al. | |
| 7,848,529 B2 * | 12/2010 | Zhang et al. | 381/92 |
| 8,184,180 B2 | 5/2012 | Beaucoup | |
| 8,452,019 B1 * | 5/2013 | Fomin et al. | 381/58 |
| 2004/0203520 A1 | 10/2004 | Schirtzinger et al. | |
| 2005/0271216 A1 | 12/2005 | Lashkari | |
| 2006/0072248 A1 | 4/2006 | Watanabe et al. | |
| 2008/0204379 A1 | 8/2008 | Perez-Noguera | |
| 2008/0292112 A1 | 11/2008 | Valenzuela et al. | |
| 2009/0060222 A1 | 3/2009 | Jeong et al. | |
| 2009/0247237 A1 | 10/2009 | Mittleman et al. | |
| 2009/0274315 A1 | 11/2009 | Carnes et al. | |
| 2009/0316943 A1 | 12/2009 | Munoz et al. | |
| 2010/0103776 A1 | 4/2010 | Chan | |
| 2010/0110232 A1 | 5/2010 | Zhang et al. | |
| 2011/0002487 A1 | 1/2011 | Panther et al. | |
| 2011/0033064 A1 | 2/2011 | Johnson et al. | |
| 2011/0161074 A1 | 6/2011 | Pance et al. | |
| 2011/0164141 A1 | 7/2011 | Tico et al. | |
| 2011/0274303 A1 | 11/2011 | Filson et al. | |
| 2012/0082317 A1 | 4/2012 | Pance et al. | |
| 2012/0243698 A1 * | 9/2012 | Elko et al. | 381/66 |

FOREIGN PATENT DOCUMENTS

| | | |
|---|---|---|
| GB | 2342802 | 4/2000 |
| JP | 62-189898 | 8/1987 |
| JP | 2102905 | 4/1990 |
| WO | WO 01/93554 A2 | 12/2001 |
| WO | WO03/049494 | 6/2003 |
| WO | WO2004/025938 | 3/2004 |
| WO | WO2007/083894 | 7/2007 |
| WO | WO2008/153639 | 12/2008 |
| WO | WO2009/017280 | 2/2009 |
| WO | WO2011/057346 | 5/2011 |

OTHER PUBLICATIONS

Pingali et al., "Audio-Visual Tracking for Natural Interactivity," Bell Laboratories, Lucent Technologies, pp. 373-382, Oct. 1999.

International Search Report and Written Opinion, for the corresponding International Application No. PCT/US2012/057909, mailing date of Feb. 19, 2013, 14 pages.

International Preliminary Report on Patentability for corresponding International Application No. PCT/US2012/057909, mailing date Jun. 19, 2014, 10 pages.

* cited by examiner

NEAR-FIELD NULL AND BEAMFORMING

CROSS-REFERENCE TO RELATED APPLICATIONS

This application is a continuation-in-part of U.S. patent application Ser. No. 13/312,498, filed Dec. 6, 2011 and titled "Near-Field Null and Beamforming;" the disclosure of which is hereby incorporated herein in its entirety.

TECHNICAL FIELD

The present discussion is related to acoustic noise reduction for microphone arrays, and more particularly to creating an acoustic null for the microphones where a noise source is located.

BACKGROUND

Portable electronic devices continue to trend smaller while providing increased and improved functionality. Because of the limited space on the smaller devices, creative and sometimes less than ideal positioning of components occurs. For example, a microphone and a speaker may be positioned in close proximity of each other. This leads to a high degree of coupling from the speaker radiated signal to the microphone capsule. While this is not a big problem when the microphone is not being used to pick up a local talker, it is challenging for acoustic echo cancellers to spectrally subtract the speaker playback signal from the microphone signal that includes both the local talker and the speaker signal.

Also, because of the proximity of the speaker(s) to the microphones, the sound pressure level of the radiated signal from the speaker is often greater than that of the talker. This typically leads to a poor signal-to-noise ratio (SNR) and presents a formidable challenge for echo cancellers that can be exacerbated if the speaker to microphone path is non-linear.

SUMMARY

Devices and methods are disclosed that allow for selective acoustic near-field nulls for microphone arrays. One embodiment may take the form of an electronic device including a speaker and a microphone array. The microphone array may include a first microphone positioned a first distance from the speaker and a second microphone positioned a second distance from the speaker. The first and second microphones are configured to receive an acoustic signal. The microphone array further includes a complex vector filter coupled to the second microphone. The complex vector filter (both magnitude and phase over the frequency range of interest) is applied to an output signal of the second microphone to generate an acoustic sensitivity pattern for the array that provides an acoustic null at the location of the speaker.

Another embodiment may take the form of a method of operating an electronic device to functionally provide an acoustic near-field unidirectional microphone and a far-field omnidirectional microphone. The method includes receiving an acoustical signal at an acoustic transducer array. The acoustic transducer array has a plurality of microphones. The method also includes generating a plurality of electrical signals, wherein each microphone of the acoustic transducer array generates an electrical signal. A beamformer is implemented that creates a near-field null in a position that corresponds to a location of a near-field noise source. Additionally, the beamformer provides a generally omnidirectional acoustic respond in the far-field. The farfield beamformer sensitivity may generally be defined by:

$$Y(\omega,\theta)=|S(\omega)|\sqrt{[(A^2+1)-2A\cos\phi]},$$

where S is the acoustic signal, and $\phi=kd(1+\cos\theta)$, where θ is the angle of incidence of the normal of the wave to the axis of the array, k is the wave number, and d is the distance between the first and second microphones.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

DETAILED DESCRIPTION

In order to reduce or eliminate microphone-speaker echo coupling in certain electronic devices, beamforming techniques may be implemented in the near-field to create an acoustic null at the location of the speaker. In particular, multiple microphones may be implemented to form an array from which signals may be processed in a manner such that the sound from the speaker is reduced or eliminated.

In one embodiment, for example, two microphones may be used to form a microphone array. The microphone array may be coaxial with a speaker. Additionally, in some embodiments, the array may be coaxial with a user. One of the microphones of the array may be located closer to the speaker than the other microphone. Because of near-field effects, the acoustic pressure level at this microphone may be significantly greater than that of the microphone located farther away from the speaker due to the inverse relationship between sound pressure and distance from the source. A complex vector having a magnitude and phase with respect to frequency may be applied to the closest microphone to help equalize signals output by the microphones and effectively reduce or eliminate the microphone-speaker echo coupling when the microphone signals are combined.

In some embodiments, the result of the complex compensation vector is a cardioid sensitivity pattern being formed by the microphone array in the near field. The cardioid sensitivity pattern includes an acoustic null of near-field sources, such as the speaker. In contrast, the vector also results in the microphone array performing as an omnidirectional microphone in the far-field, where the talker may be located. Hence, the vector results in the rejection of the sounds emitted from the speaker while achieving high sensitivity to the local talker.

In other embodiments, additional microphones may be implemented in the microphone array. These additional microphones may allow second, third, fourth and fifth order sensitivity patterns that may include multiple acoustic nulls. For example, in some embodiments, three microphones may be implemented in the array and an acoustic sensitivity pattern may be formed that includes two acoustic nulls: one for the speaker and one for a second noise source, such as a system fan or the like. In other embodiments, placement of the acoustic nulls may be dynamic and changes as a determined location of a noise source changes.

Figure 1:
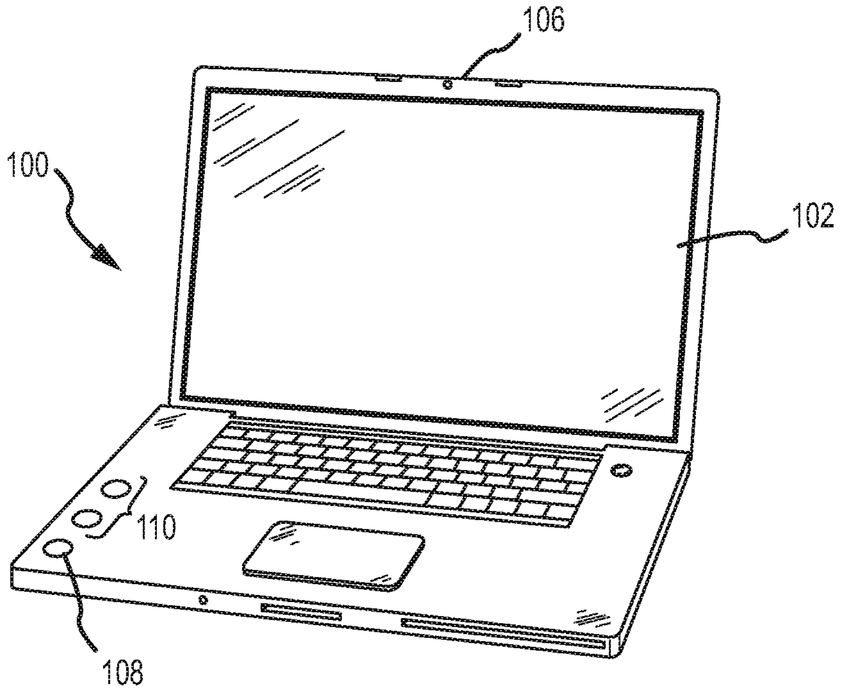
FIG. 1 illustrates an example electronic device having a microphone array configured with an acoustic near-field null.

Referring to FIG. 1, an example electronic device 100 is illustrated. The electronic device 100 is a notebook computer in FIG. 1. It should be appreciated, however, that the electronic device 100 is presented merely as an example and the techniques described herein may be implemented is a variety of different electronic devices including cellular phones, smart phones, media players, desktop computers, televisions, cameras, and so forth.

The electronic device 100 includes a display 102, a camera 106, a speaker 108 and a microphone array 110. The electronic device 100 may be configured to provide audio and video playback, and audio and video recording. Generally, audio playback may be provided via the speaker 108.

Telecommunication functionality including audio based phone calls and video calls may be provided by the device 100. As the microphone array 110 is proximately located to the speaker 108, the use of the device 100 for such services encounters the aforementioned issues with respect to signal to noise ratio (SNR) and microphone-speaker echo coupling.

Figure 2A:
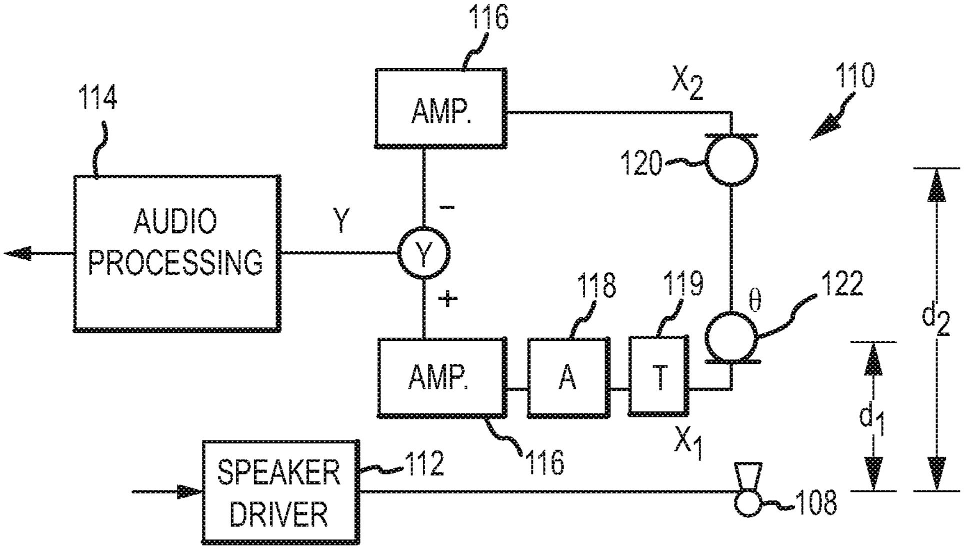
FIG. 2A illustrates the microphone array of the device of FIG. 1, with a speaker located in the acoustic near-field coaxially with the array.

Turning to FIG. 2A, the microphone array 110 is illustrated in proximity to the speaker 108. The speaker 108 may be driven by a speaker driver 112 which may receive audio signals from the system of the device 100. The microphone array 110 may be coupled to audio processing 114 which may be configured to process signals from the microphones of the microphone array 110 and provide them to the system of the device 100. The audio processing 114 may include processors, filters, digital signal processing software, memory and so forth for processing the signals received from the microphone array 110. Amplifiers 116 may be provided to amplify the signals received from the microphone array 110 prior to processing the signals. It should be appreciated that analog to digital converters (not shown) may also be utilized in conjunction with the amplifiers 116 so that a digital signal may be provided to the audio processing 114. At least one of the microphones of the microphone array 110 may be coupled to a complex vector filter 118, as will be discussed in greater detail below. Additionally, at least one of the microphones may be coupled to another filter 119.

Generally, the microphone array 110 may include two microphones that may be coaxial with a speaker 108. Although, it should be appreciated that in other embodiments, the speaker 108 may not be coaxial with the array 110. Additionally, in some embodiments, the microphone array 110 may be approximately coaxial with an expected location of a user. The two microphones may be located a distance "d" from each other. In some embodiments, the distance d may be between 10-40 mm, such as approximately 20 mm. In other embodiments, the distance d between the microphone may be greater or lesser.

As shown, a first microphone 120 of the array 110 may be located further away from the speaker 108 than the second microphone 122. The difference in distance from speaker 108 between the first and second microphones 120, 122 results in the first microphone receiving the sound wave later and with a lower amplitude than the second microphone. Generally, the delay may be defined as: $(d_2-d_1)/c$, where c is the speed of sound. Additionally, the amplitude of the sound wave is based on the distance of each microphone from the speaker. It may be defined for the first microphone as $1/d_2$, and $1/d_1$ for the second microphone. Thus, the amplitude difference between the received signals may be predominantly based on the relative distances of the microphones from the speaker in the near field and it may be an inverse relationship (e.g., the greater the distance, the smaller the amplitude). In contrast, sound sources in the far field generally will have the same or substantially similar amplitudes. Indeed, the acoustic far field may be roughly defined based on a distance from the array 110 where the amplitude of sound wave sensed by each of the microphones has approximately equal amplitude. That is, the source is located a sufficient distance away from the array that the distance between the microphones of the array is generally inconsequential with respect to the relative amplitude of the signals generated by the microphones in response to the sound from the sound source.

Figure 3:
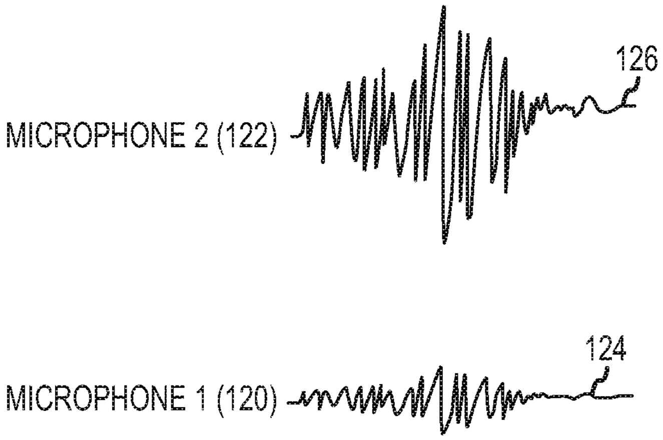
FIG. 3. illustrates example output signals of microphones in the array when the speaker shown in FIG. 2 is driven.

FIG. 3 illustrates example signals 124, 126 output from the first and second microphones 120, 122 upon sensing sound waves. It should be appreciated that the time delay is not illustrated in FIG. 3. While the illustrated signals 124, 126 have similar shapes (e.g., similar spectral distribution), the amplitude of the signal 126 output by the second microphone 120 is much larger than that of the first microphone 120.

A complex vector may be applied to the signal 126 of the second microphone 122 that compensates for the near-field effects and operates as a beamforming filter to generate a desired acoustic sensitivity of the microphone array 110. For example, in this example, the desired acoustic sensitivity may take the form of a cardioid that presents an acoustic null at the location of the speaker 108. Generally, to form the desired cardioid sensitivity pattern, the signal from microphone 122 is delayed and subtracted from the signal of microphone 120. It should be appreciated that depending on the spatial relationship of the speaker 108 to the microphone array 110, a different near field sensitivity pattern may be desired. That is, the cardioid pattern may be suitable when the speaker 108 is coaxial with the array 110, but another pattern may be more suitable when the speaker and array are not coaxial.

Referring again to FIG. 2A, the signals generated by the microphones may be represented by:

$$x_1 = S_n(\omega),$$

and $$x_2 = (d_1/d_2)S_n(\omega)e^{-jk(d_2-d_1)}.$$

Generally, $$(d_1/d_2)$$

defines the physical gain relationship between the speakers due to the propagation of sound in air. It typically is treated in the digital realm and thus the physical relationship between the microphones has been constrained by a minimum sampling rate. That is, the distance between the microphones was correlated to the sampling rate of the system. However, for the present purposes, the analog realm is used so that the same constraints are not presented. The combination of the signals after filtering is:

$$y = Ae^{-jT\omega}S_n(\omega) - (d_1/d_2)S_n(\omega)e^{-jk(d_2-d_1)},$$

where S represents the acoustic signal, ω represents the frequency of the signal, θ is the angle between the axis of the array 110 and line from the second microphone forming a right triangle with the path of the sound waves that reach the first microphone, k is the wave number, T is an added time delay, d is the distance between the microphones 120, 122, and j is the imaginary number. As beamformers are inherently frequency dependent, a compensation vector "A" (may also be referred to as "gain factor A") is provided to help adjust and compensate for the frequency dependence. If the filter 118 is designed such that the filtering matches the physical relationship (e.g., $$A = (d_1/d_2),$$

and $$T = (d_2 - d_1/c)),$$

then y=0.

Thus, the array 110 is configured to cancel the near-field signal by creating an acoustic null in the near field. The positioning of the null may be achieved by designing/adjusting the filters 118 and 119 (e.g., T and A factors). In particular, varying T between 0 and d/c rotates the position of the null (i.e. T=d/c) would be below the device (as shown in the FIG. 2A) and T=0 would pace the null to the side of the array. Varying A moves the null toward or away from the device (i.e. A=1 moves the null to the far field and setting A<1 brings the null closer to the device)

Figure 2B:
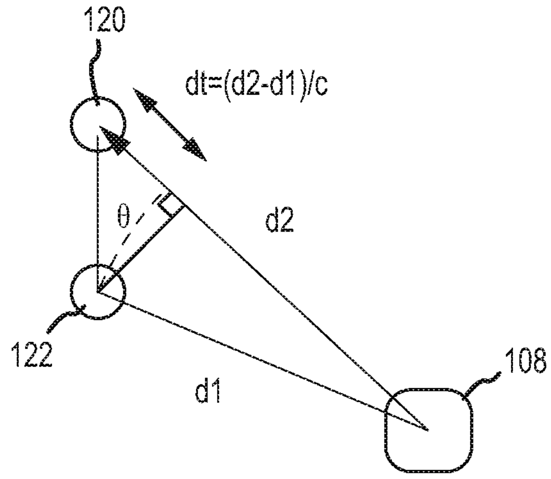
FIG. 2B illustrates the microphone array of the device of FIG. 1, with a speaker located in the acoustic near field in a non-axial position relative to the array.

FIG. 2B illustrates an example embodiment where the near field source is offset from the axis of the array. Using the equations set forth above, $$y = Ae^{-jT\omega}S_n(\omega) - (d_1/d_2)S_n(\omega)e^{-jk(d_2-d_1)}$$

Again, T may be set to $$(d_2 - d_1)/c$$

and A may be set to $$(d_1/d_2)$$

to place the null in a desired location where y=0 to provide a near field null at the location of the speaker. The setting of T to $$(d_2 - d_1)/c$$

(or d cos(θ), where d is the distance between the microphones) changes the placement of the null based on the physical relationship of the noise source to the array. In some embodiments, A and/or T may be manipulated as to change the near-field sensitivity pattern and placement of the null in the near field. Hence, the beamformer may be customized and/or dynamically configured to place an acoustic null in the near field to reduce near field noise sources, such as the speaker 108.

While the near field acoustic sensitivity has a null, such as one resulting from a cardioid sensitivity pattern, the far field acoustic sensitivity may be omnidirectional in some embodiments. In other embodiments, the far field sensitivity pattern may have one or more nulls and the nulls, and the sensitivity pattern in the far field, may be different from that of the near-field. In some embodiments, the output signals after filtering for the far field may be defined by the following equation:

$$|y| = |S|\sqrt{[(A^2+1)-2A\cos\phi]}.$$

That is, the foregoing equation shows the far-field sensitivity of the array 110. The array 110, therefore, may provide a null in the near field, but have omnidirectional sensitivity in the far-field.

The step-by-step derivation of the equation incorporating compensation vector A includes the distributive property, trigonometric identities and complex exponentials, as shown below. Starting with the same equation used for the near field:

$$y = As(\omega) - AS(\omega)[e^{-jwT}e^{kd}],$$

S(ω) is drawn out using the distributive property to give:

$$Y(\omega,\theta) = S(\omega)[(A - e^{-j(\omega T + (kd))}],$$

where both k and d are vectors whose product is given by kd cos θ and where k and d are now the magnitude of the vectors. This equation describes the output of the beamformer due to a source in the far-field (i.e., the pressure at both microphones due to the source S(ω) is equal). Then, the exponent −j is multiplied through to give:

$$Y(\omega,\theta) = S(\omega)[A - e^{-jkd}e^{-jkd\cos\theta}].$$

The distributive property of the complex exponent gives:

$$Y(\omega,\theta) = S(\omega)[A - e^{-jkd(1+\cos\theta)}].$$

Euler's formula relates the complex exponent to trigonometric functions to give:

$$Y(\omega,\theta) = S(\omega)[A - \cos(kd(1+\cos\theta) - j\sin(kd(1+\cos\theta))].$$

The kd term is multiplied through using the distributive property to provide:

$$Y(\omega,\theta) = S(\omega)[A - \cos(kd + kd\cos\theta) - j\sin(kd(1+\cos\theta))].$$

Finding the magnitude of Y and using trigonometric identities give:

$$|Y(\omega,\theta)| = |S(\omega)|[(A - \cos\phi)^2 + \sin^2\phi],$$

where Φ is given by kd(1+cos θ). Multiplying (A−cos ϕ) with (A−cos ϕ) gives:

$$|Y(\omega,\theta)| = |S(\omega)|\sqrt{[A^2 - 2A\cos\phi + \cos^2\phi + \sin^2\phi]}.$$

Trigonometric identities may reduce it to:

$$|Y(\omega,\theta)|=|S(\omega)|\sqrt{[A^2-2A\cos\phi+1]}, \text{ and}$$

$$|y|=|s|\sqrt{[(A^2+1)-2A\cos\phi]}.$$

The frequency compensation vector A may be empirically determined to place the acoustic null over the location of the speaker 108. The frequency compensation vector A may generally be some number less than one in some embodiments. In other embodiments, the compensation vector A may be greater than one, which would place a null on the other side of the array 110. For example, in some embodiments, the frequency compensation vector A may be less than 0.6, such as approximately 0.5, 0.4, 0.3, 0.2 or 0.1. It should be appreciated, however, that the frequency compensation vector A may be any suitable number less than one that provides the desired acoustical sensitivity pattern (e.g., places an acoustic null at the location of the speaker).

Figure 4:
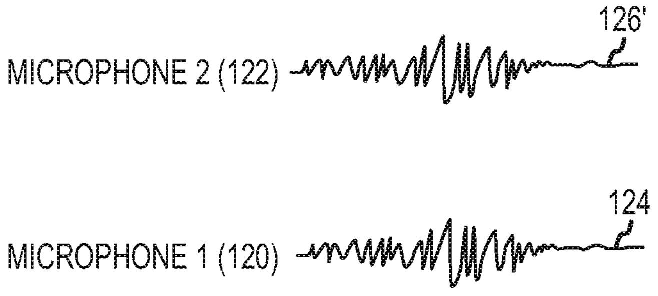
FIG. 4 illustrates modification of one of the signals of FIG. 3 after filtering.
Figure 5:
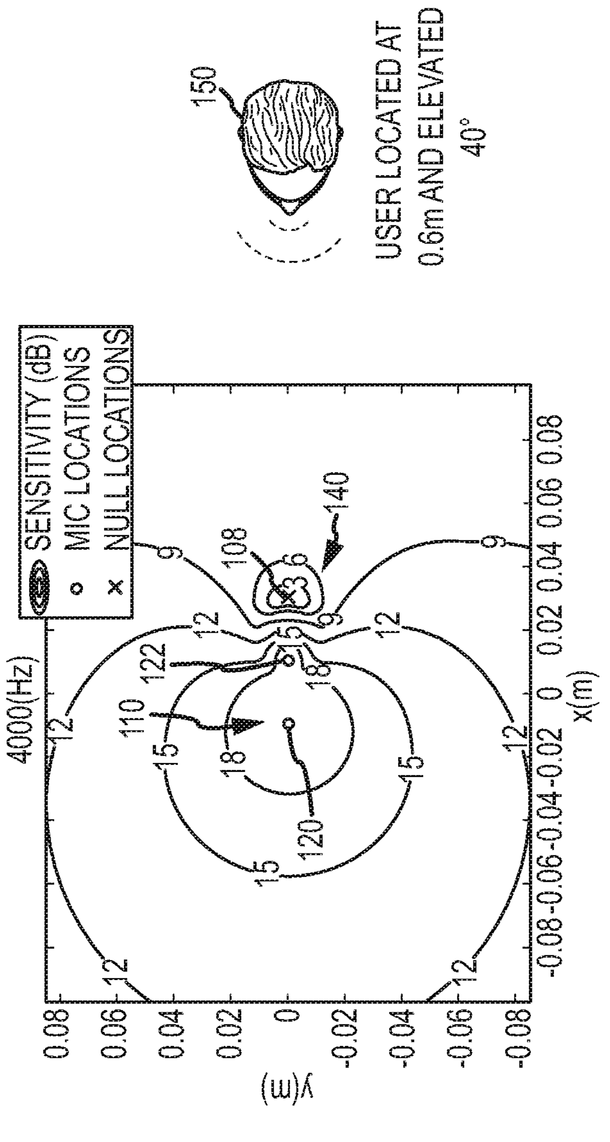
FIG. 5 illustrates an example acoustic sensitivity pattern having a near-field null and far-field omnidirectional sensitivity.

FIG. 4 illustrates the output signal 126' after the filter has been applied to the signal 126. As may be seen, the amplitude of the signals 126' and 124 are approximately equal. Furthermore, the application of the filter achieves the desired acoustical sensitivity pattern. The pattern is illustrated in FIG. 5 as a cardioid with a null 140 at the location of the speaker 108. In FIG. 5, the microphones 120,122 may be spaced approximately 20 mm apart and the second microphone 122 may be approximately 20 mm from the speaker 108. In other embodiments, the spacing between the microphones 120, 122 and the speaker 108 may vary and the frequency compensation factor may be adjusted accordingly. Generally, the acoustic null 140 may have the effect of reducing acoustic signals approximately 6 dB or more in the near-field where the null is located. Contrastingly, the acoustic sensitivity of the microphone array may function omnidirectionally in the far-field (e.g., the array provides an acoustic sensitivity pattern approximately representative of an omnidirectional microphone in the far-field). This is achieved by the array 110 providing approximately uniform sensitivity in the far-field depending on the distance from the array. Thus, the filter may achieve the rejection desired for the speaker 108 while achieving a high sensitivity to a user's speech.

In FIG. 5, a user 150 is illustrated in the acoustic far-field and coaxial with the microphone array 110 to show that the user may be located in the direction of the near-field null and the far-field sensitivity in that direction will not be impacted. That is, due to the omnidirectional sensitivity in the far-field, the user 150 may be in line with the null and will still pick up the user's speech. In other embodiments, the user may not be coaxial with the array and the array will still pick up the user's speech. Additionally, the user 150 may or may not be co-planar with the microphone array 100. Indeed, the user 150 may be elevated relative to the plane of the array 110 and speaker 108. For example, the user may be elevated between 20 and 60 degrees (in one embodiment the user may be approximately 40 degrees elevated) relative to the microphone array. Due to the approximately omnidirectional acoustical sensitivity of the microphone array 110 in the far-field, the user 150 may be positioned in a variety of positions in the far-field and the microphone array will be able to pick-up the user's speech, while rejecting "noise" that may be originating in the near-field (e.g., from the speaker 108).

Figure 6:
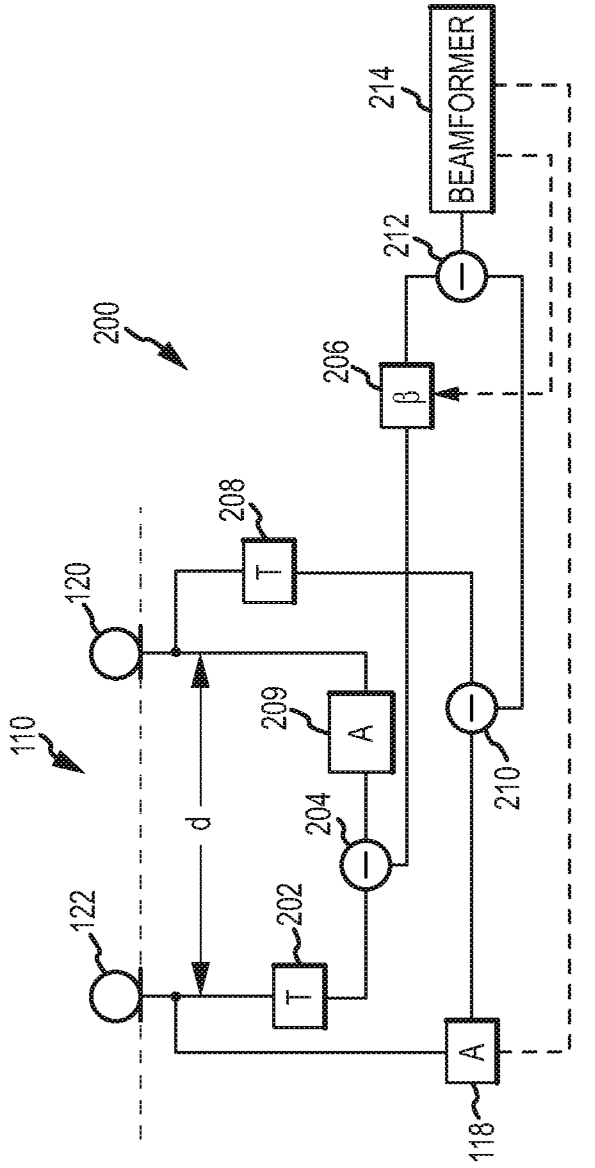
FIG. 6 illustrates an alternative microphone array configured to provide selective acoustic sensitivity patterns.

It should be appreciated that more complex beamforming schemes may be implemented based on the foregoing principles utilizing the complex vector and gain factor A. In some embodiments, a dynamic beamformer may be implemented that allows for dynamic placement of nulls. FIG. 6 illustrates an example circuit diagram for a dynamic null placement circuit 200. At a high level, the circuit illustrated in FIG. 6 includes two of the circuit of FIG. 2A. As with the prior examples, the dynamic null placement circuit 200 may include the microphones 120, 122 separated a distance d. A signal output from the microphone 122 may be routed through the filter 118 to be filtered by the complex vector with the gain factor A. Additionally, the signal from microphone 122 may be subject to a delay T 202 and pass to a difference circuit 204 to be subtracted from the filtered signal (filtered by filter 209) from the microphone 120. The difference is provided to a secondary filter 206 which will be discussed in greater detail below.

In addition to being filtered and provided to the difference circuit 204, the output of the microphone 120 is provided to a delay circuit 208. The output of the delay circuit 208 is provide to a difference circuit 210 which also receives an out of the filter 118. The output of the difference circuit 210 is provided to yet another difference circuit 212 which also receives the output from the filter circuit 206. The output of the difference circuit 212 is provided to beamforming circuitry 214 which may include one or more processors, memory, and so forth to determine a location of a noise source and dynamically adjust the filter of filter circuit 206 to create an acoustic null in the sensitivity of the microphone array 110 to account for the noise source.

A differential beamforming equation for the beamforming circuitry 214 may generally take a form similar the equations set forth above. However, the A and β that can be selected to change the location of the desired nulls while T is fixed by the delay time between the microphones, i.e., =d/c. In this case A may be used (as above) to bring the null closer to the device (A=1 is far field and A<1 brings the null closer to the device) and β rotates the location of the null relative to the device. Generally, β=0 places the null below the array and β=1 places the null to the side of the array.

Generally, when A is selected to be one, the output may take the form of two cardioid sensitivity patterns oriented in opposite directions. If A is no longer selected as one, then the sensitivity pattern is no longer a cardioid pattern. As discussed above, selection of A may also create a null in the near field. In some embodiments, the shaping may include monopole and dipole components. Selection of other filtering parameters may provide other sensitivity patterns. Thus, a null in the far-field to exclude a far-field noise source may be provided without losing acoustic sensitivity to a user. Moreover, the user may be located anywhere in the far-field.

Figure 7:
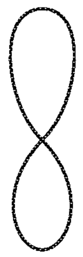
FIG. 7 illustrates an example acoustic sensitivity pattern.
Figure 8:
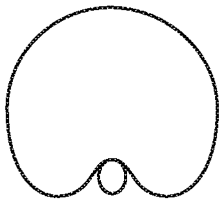
FIG. 8 illustrates another example acoustic sensitivity pattern.

Additionally, the filter 206 includes β which combines the outputs to provide a desired beam form sensitivity. β operates in the frequency domain, as does A. That is, A and β are a function of frequency. To achieve a simple cardioid pattern, the β may be set to 0. To achieve a dipole sensitivity pattern, such as that shown in FIG. 7, β may be set to −1. To achieve a hyper cardioid such as that shown in FIG. 8, β may be set to −26. These beam forms are provided as examples and other shapes may also be achieved.

In some embodiments, the β may be dynamically selected based on feedback from the beamformer circuit 214. The β may be set after one or more alternatives have been tested to determine which provides the greatest noise immunity. For example, A may be preset and β can be manipulated/tested until a desired sensitivity pattern is found. As such, the selection of a β may be automated for the far-field to minimize the noise. In still other embodiments, both the β and the A may be selectively modified to achieve a desired noise immunity based on the beamforming shape. In such case, the beamforming circuitry 214 may provide feedback to each of the filter circuits 118 and 206. This may be particularly useful when the selected value of A may be found not well suited to a particular context, such as where there is a significant amount of acoustic reflections in the room.

Figure 9:
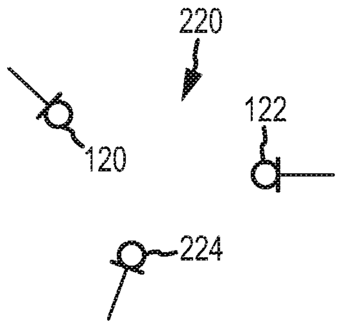
FIG. 9 illustrates a microphone array having three microphones.
Figure 10:
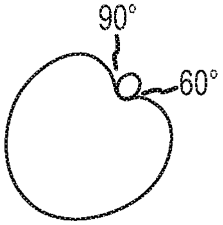
FIG. 10 illustrates another acoustic sensitivity pattern having nulls at approximately 60 and 90 degrees.

In some embodiments, more than two microphones may be utilized to provide further flexibility in null placement. For example, as illustrated in FIG. 9, an array 220 having three microphones 120, 122, 224 may be provided. With the three microphones 120, 122, 224 the acoustic nulls may be selected not by only the shape of the acoustic sensitivity pattern of the array 220, but also the orientation of the acoustic sensitivity pattern. For example, in FIG. 10, a hyper cardioid sensitivity pattern may be created and then rotated to effectively produce acoustic nulls at approximately 60 degrees and 90 degrees, as shown.

Generally, the number of degrees of freedom for placement of null is equal to the number of microphones. In some embodiments, it may be possible to create as many nulls as are microphones or even more nulls than there are microphones. However, one or more null may be spatially dependent on another null or fixed relative to another null.

In some embodiments, one of the microphones 120, 122, 224 may be located near a system fan to neutralize the noise generated by the fan. It should be appreciated that a circuit diagram for microphone arrays having greater than two microphones may generally take a form similar to that illustrated in FIG. 6 for the two microphone case. For the sake of simplicity the circuitry has not been shown. However, the size of the circuit would multiply as increasingly more microphones are added. In particular, more than one filter 118 may be provided to help filter out near-field echo. For example, a filter may be provided for one or more microphones that may be located near a system fan, hard disk drive, or a keyboard, for example, that generates acoustic noise. Generally, it may be desirable to provide sufficient microphones and/or filters to create an acoustic null for each known noise source so that operation of the system does not interfere with or degrade the ability of the system to register a user's speech or sounds that a user desires the system to receive. It should be appreciated that one or more microphones may be located inside of an enclosure of the computing device. As such, the microphones of the array may not be co-planer with each other and, further, may not be co-axial with each other. Additionally, more than one filter 206 may be provided to help further define the contours of the acoustic sensitivity pattern and to create acoustic nulls in the far-field as well as in the near-field.

Figure 11:
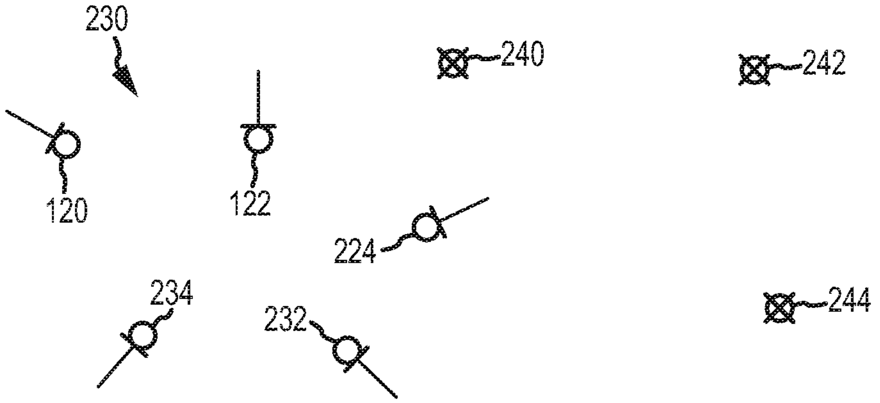
FIG. 11 illustrates a microphone array having five microphones and providing at least three acoustic null regions.

Generally, with even more microphones in the array, further selectivity of both null placement and acoustic pattern sensitivity may be provided. For example, in FIG. 11, an array 230 having five microphones 122, 124, 224, 232, 234 is illustrated as providing three acoustic null regions 240, 242, 244. It should be appreciated that more than three null regions may be defined and that the null regions may be spatially distributed. Additionally, the null regions may be adaptively set based on noise source location.

In one embodiment, the device may selectively test one or more filtering values (e.g., A and/or β) to determine which of the tested values provide the best noise reduction and/or improved signal to noise ratio. In some embodiments, the system may be configured to sequentially test filtering values provided from a table or database, for example. In other embodiments, the system may be configured to test a select number of filter values (e.g., between two and one-hundred) and then iteratively modify and test new values based on relative effectiveness of the values. For example, initially, a first value and a second value may be tested. If the first value achieved better results than the second value, then the first value may be modified (e.g., may be slightly increased and slightly decreased) and then tested again. The process may repeat for a finite number of iterations or until the system is unable to achieve further improvement through modification of the values.

Additionally, an amplitude of the received signals may be utilized to determine which microphone output should be filtered and how they should be filtered. For example, if one microphone provides a larger amplitude signal than the other microphones, the noise source location may initially be defined as being somewhere nearer the microphone with the higher amplitude than other microphones. As such, filtering and filter values may be selectively applied to create a null in space where the noise source may possibly be located. By tuning β, a variety of beam patterns can be created with nulls positioned at specific angles.

Moreover, in some embodiments, when a location of a noise source has been determined and an acoustic null has been created for the location, the device may be configured to adaptively preserve the null while the device moves. That is, movement and/orientation sensors (e.g., accelerometers and/or gyroscopes) may be used to determine the movement and/or orientation of the device relative to the noise source and adapt the acoustic sensitivity pattern of the array to preserve the effectiveness of the acoustic null.

The foregoing describes some example embodiments that provide specific acoustic sensitivity patterns with selective null positioning to help decrease echo coupling between speakers and microphones and improve the signal to noise ratio of a system. In particular, embodiments provide for software processing of signals to achieve a near-field unidirectional microphone approximation and a far-field omnidirectional microphone, so that near-field noise may be reduced and far-field acoustics improved. Although the foregoing discussion has presented specific embodiments, persons skilled in the art will recognize that changes may be made in form and detail without departing from the spirit and scope of the embodiments. Accordingly, the specific embodiments described herein should be understood as examples and not limiting the scope thereof.

The invention claimed is:

1. An electronic device comprising:

a speaker; and a microphone array comprising:

- a first microphone positioned a first distance from the speaker;
- a second microphone positioned a second distance from the speaker, wherein the first and second microphones are configured to receive an acoustic signal;
- a complex vector filter coupled to the second microphone, wherein the complex vector filter is applied to an output signal of the second microphone to generate an acoustic sensitivity pattern for the array that provides an acoustic null at the location of the speaker;
- a first delay circuit coupled to the second microphone;
- a first difference circuit coupled to the first delay circuit and the first microphone;
- a multiplier circuit coupled to the output of the first difference circuit;
- a second difference circuit coupled to the output of the multiplier circuit;
- a second delay circuit coupled to the first microphone;
- a third difference circuit coupled to the second delay circuit and an output of the complex vector filter, wherein the output from the third difference circuit is provided to the second difference circuit; and a beamforming circuit coupled to the output of the second difference circuit, wherein the beamforming circuit is configured to form an acoustic sensitivity pattern for the array by adjusting values for the complex vector filter or the multiplier circuit.

2. The electronic device of claim 1, wherein the complex vector filter comprises a gain factor A to compensate for an amplitude difference between the output signal of the second microphone and an output signal from the first microphone.

3. The electronic device of claim 2, wherein the beamforming circuit is configured to selectively provide a value to the multiplier circuit, wherein the acoustic sensitivity pattern is determined at least in part based upon the provided value.

4. The electronic device of claim 3, wherein the beamforming circuit is configured to selectively provide the gain factor A to the complex vector filter, wherein the acoustic sensitivity pattern is determined at least in part based upon the provided value.

5. The electronic device of claim 3, wherein the beamforming circuit is configured to dynamically change the provided value.

6. The electronic device of claim 2, wherein the gain factor A is fixed.

7. The electronic device of claim 2, wherein the effect of the filter in a far field is described by the equation:

$$Y(\omega,\theta)=|S(\omega)|\sqrt{(A^2+1)-2A\cos\phi},$$

where S is the acoustic signal, ω is the frequency of the signal, θ is an angle of propagation of the signal, k is a wave number, d is the distance between the first and second microphones, and Φ=kd(1+cos θ).

8. The electronic device of claim 1, wherein the first microphone, second microphone and speaker are coaxial.

9. The electronic device of claim 1, wherein the second microphone is located closer to the speaker than the first microphone.

10. The electronic device of claim 9, wherein the microphone array functions as a unidirectional microphone in a near-field.

11. The electronic device of claim 10, wherein the near-field comprises a distance from the speaker less than 100 mm.

12. The electronic device of claim 10, wherein the microphone array functions as an omnidirectional microphone in a far-field.

13. The electronic device of claim 12, wherein the far-field comprises a distance from the first and second microphones greater than 100 mm.

14. The electronic device of claim 1, wherein the first and second microphones are positioned between approximately 10 and 60 mm apart.

15. The electronic device of claim 14, wherein the first and second microphones are positioned approximately 20 mm apart.

16. The electronic device of claim 14, wherein the speaker is positioned between approximately 10 and 30 mm from the second microphone.

17. A method of operating an electronic device to functionally provide an acoustic near-field unidirectional microphone and a far-field omnidirectional microphone, the method comprising:

receiving an acoustical signal at an acoustic transducer array, wherein the acoustic transducer array comprises at least a first and a second microphones;

generating a plurality of electrical signals, wherein each microphone of the acoustic transducer array generates an electrical signal;

filtering at least one of the electrical signals according to the complex vector such that the output is defined by filtering at least one of the electrical signals according to the complex vector such that the output is defined by $$Y(\omega,\theta)=|S(\omega)|\sqrt{(A^2+1)-2A\cos\phi},$$

wherein S is the acoustic signal, ω is the frequency of the signal S, θ is an angle of propagation of the signal S, k is a wave number, d is the distance between a first and second microphones, Φ=kd(1+cos θ), and A is a gain factor, wherein filtering generates an acoustical sensitivity pattern for the acoustical transducer array that provides a near-field null.

18. The method of claim 17 further comprising:

delaying the at least one of the electrical signals;

subtracting the delayed signal from another signal of the electrical signals to output a difference between the delayed signal and the other signal; and multiplying the difference by value that determines, at least in part, the shape of the acoustic sensitivity pattern.

19. The method of claim 18 further comprising dynamically adjusting at least one of the gain factor A and the value.

* * * * *